(12) United States Patent
Luetgert et al.

(10) Patent No.: US 6,610,164 B2
(45) Date of Patent: Aug. 26, 2003

(54) METHOD OF SELECTIVELY COATING A WOOD COMPOSITE

(75) Inventors: Karine A. Luetgert, Geneva, IL (US); Raymond H. Pittman, Batavia, IL (US)

(73) Assignee: Masonite Corporation, Tampa, FL (US)

( * ) Notice: Subject to any disclaimer, the term of this patent is extended or adjusted under 35 U.S.C. 154(b) by 137 days.

(21) Appl. No.: 09/940,016

(22) Filed: Aug. 27, 2001

(65) Prior Publication Data

US 2002/0048660 A1 Apr. 25, 2002

Related U.S. Application Data

(60) Provisional application No. 60/234,136, filed on Sep. 21, 2000.

(51) Int. Cl.$^7$ .................. B44C 1/165; B32B 31/20; B32B 9/06; B32B 3/00; B41M 3/12
(52) U.S. Cl. .................. 156/230; 156/235; 156/240; 156/247; 156/277; 156/289; 156/540; 427/148; 428/421; 428/195; 428/202; 428/207; 428/15; 428/914
(58) Field of Search .................. 156/230, 234, 156/235, 239, 240, 241, 247, 277, 289, 272.2, 285, 540, 580, 582; 427/146, 147, 148; 428/42.1, 195, 200, 202, 207, 214, 15, 914; 101/33, 34

(56) References Cited

U.S. PATENT DOCUMENTS

| | | | |
|---|---|---|---|
| 3,551,241 A | 12/1970 | Heeb et al. | 156/230 |
| 3,616,176 A | 10/1971 | Jachimowicz | 161/165 |
| 3,770,479 A | 11/1973 | Dunning | 117/3.4 |
| 3,929,545 A | 12/1975 | Van Dyck et al. | 156/220 |
| 3,936,570 A | 2/1976 | Iwata | 428/349 |
| 3,953,635 A | 4/1976 | Dunning | 428/151 |
| 3,971,866 A | 7/1976 | Johnson | 428/40 |
| 4,007,067 A | 2/1977 | Dunning | 156/61 |
| 4,061,516 A | 12/1977 | George et al. | 156/94 |
| 4,084,032 A | 4/1978 | Pasersky | 428/172 |
| 4,125,655 A | 11/1978 | Kanzelberger | 428/67 |
| 4,154,882 A | 5/1979 | Ungar et al. | 428/165 |
| 4,225,641 A | 9/1980 | Yokomizo | 428/41 |
| 4,232,077 A | 11/1980 | Meisel | 428/174 |
| 4,263,077 A | 4/1981 | Rampelberg | 156/238 |
| 4,284,453 A | 8/1981 | Endrizzi | 156/154 |
| 4,314,814 A | * 2/1982 | Deroode | 156/540 |
| 4,454,179 A | 6/1984 | Bennett et al. | 428/41 |
| 4,520,064 A | 5/1985 | Kanzelberger | 428/199 |
| 4,668,324 A | 5/1987 | Burns | 156/247 |
| 4,670,084 A | * 6/1987 | Durand | 156/540 |
| 4,743,509 A | 5/1988 | Vladimiro | 428/425.1 |
| 4,771,687 A | * 9/1988 | Daunheimer | 101/44 |
| 4,837,072 A | 6/1989 | Kraetschmer | 428/201 |
| 4,840,757 A | 6/1989 | Blenkhorn | 264/22 |
| 4,919,994 A | 4/1990 | Incremona et al. | 428/141 |
| 5,019,198 A | 5/1991 | Schäfer et al. | 156/230 |
| 5,393,590 A | 2/1995 | Caspari | 428/195 |
| 5,413,834 A | 5/1995 | Hunter et al. | 428/121 |
| 5,503,905 A | 4/1996 | Boris | 428/195 |

(List continued on next page.)

FOREIGN PATENT DOCUMENTS

| | | |
|---|---|---|
| EP | 0 816 122 A2 | 1/1998 |
| EP | 0 822 100 A1 | 2/1998 |
| GB | 2243805 A | 11/1991 |
| JP | 2001-58496 | 3/2001 |

OTHER PUBLICATIONS

International Search Report dated Mar. 13, 2002 in International (PCT) Application No. PCT/US01/27309.

*Primary Examiner*—J. A. Lorengo
(74) *Attorney, Agent, or Firm*—Liniak, Berenato & White, LLC

(57) ABSTRACT

The invention is directed to a method of selectively coating wood composites in a single step, while maintaining registration of the coating to the design of the molded or contoured wood composite. The invention also is directed to a structure provided by preparing a wood composite according to the inventive method.

36 Claims, 6 Drawing Sheets

U.S. PATENT DOCUMENTS

| | | | |
|---|---|---|---|
| 5,506,031 A | 4/1996 | Spain et al. | 428/172 |
| 5,534,352 A | 7/1996 | Pittman et al. | 428/535 |
| 5,641,372 A * | 6/1997 | Okuno | 156/230 |
| 5,662,977 A | 9/1997 | Spain et al. | 428/42.1 |
| 5,750,240 A | 5/1998 | Findley et al. | 428/195 |
| 5,766,774 A | 6/1998 | Lynch et al. | 428/537 |
| 5,779,840 A | 7/1998 | Boris | 156/234 |
| 5,798,017 A * | 8/1998 | Claveau | 156/382 |
| 5,894,048 A | 4/1999 | Eckart et al. | 428/339 |
| 5,897,735 A | 4/1999 | Peskin | 156/230 |
| 5,916,666 A | 6/1999 | Huber et al. | 428/195 |
| 5,916,843 A | 6/1999 | Weller | 503/227 |
| 5,928,762 A | 7/1999 | Aizawa et al. | 428/156 |
| 5,939,143 A | 8/1999 | Findley et al. | 427/256 |
| 5,948,511 A | 9/1999 | Imamura et al. | 428/195 |
| 5,950,382 A | 9/1999 | Martino | 52/311.1 |
| 5,954,905 A | 9/1999 | Hung | 156/230 |
| 5,981,009 A | 11/1999 | Iacono et al. | 428/40.1 |
| 6,045,646 A | 4/2000 | Yoshikawa et al. | 156/240 |
| 6,059,914 A | 5/2000 | Süss | 156/230 |
| 6,096,396 A | 8/2000 | Patton et al. | 428/40.1 |
| 6,136,126 A * | 10/2000 | Fenzi | 156/230 |

* cited by examiner

METHOD OF SELECTIVELY COATING A WOOD COMPOSITE

CROSS-REFERENCE TO RELATED APPLICATION

Priority benefit under 35 U.S.C. §119(e) of U.S. provisional patent application Ser. No. 60/234,136 filed Sep. 21, 2000, is hereby claimed, and the disclosure is hereby incorporated herein by reference.

BACKGROUND OF THE INVENTION

1. Field of the Invention

The invention generally relates to wood composites and coatings. More specifically, the invention relates to a method of selectively coating wood composites, and to the coated composites.

2. Description of Related Technology

Wood composites, a type of molded composite article, include man-made boards of bonded wood sheets and/or lignocellulosic materials, commonly referred to in the art by the following exemplary terms: fiberboards such as hardboard, medium density fiberboard, and softboard; chipboards such as particleboard, waferboard; and strandboard. Wood composites also include man-made boards comprising combinations of these materials.

These wood composites can be used as columns, floors, floor underlayment, roof sheathings, ceilings, walls, wall coverings, wainscots, partition systems, doors, and stairs in the construction of homes, offices, and other types of buildings, as well as furniture components, such as chairs, tables, countertops, cabinets, and cabinet doors, and other uses, such as bulletin boards, for example.

Many different methods of manufacturing these wood composites are known in the art such as, for example, those described in Hsu et al. U.S. Pat. No. 4,514,532 and Newman et al U.S. Pat. No. 4,828,643, the disclosures of which are hereby incorporated herein by reference. The principal processes for the manufacture of fiberboard include: (a) wet felted/wet pressed or "wet" processes; (b) dry felted/dry pressed or "dry" processes; and, (c) wet felted/dry pressed or "wet-dry" processes. Synthetic resins, such as urea-formaldehyde resins, melamine resins, phenol-formaldehyde resins, or modified phenol-formaldehyde resins, are often used as binders in these processes.

Wood composites made by these or other known methods appear noticeably different from natural woods. For example, wood composites do not possess the color, grain, or texture changes characteristic of natural woods. To make wood composites appear similar to natural wood, the composites typically are finished by multiple applications of coatings, stains, or glazes, which give the composites a more natural wood-like appearance. Alternatively, wood composites are, wet finished overlaid or using either vinyl films, printed papers, or hot transfer foil materials that have been imprinted with designs simulating a natural-appearing woodgrain pattern.

Several methods for finishing wood composites by application of stains or glazes are known to those skilled in the art. For example, Pittman et al. U.S. Pat. No. 5,534,352 discloses a method of finishing wood composite panels that includes the steps of providing a textured substrate, applying a ground coat to the substrate, and applying a buffing glaze to the substrate. Thereafter, the buffing glaze is selectively removed from the substrate, a sealer is applied to retain the remaining buffing glaze in textured ticks of the substrate, and gravure prints and a protective topcoat are applied to the substrate. These methods, through selective removal of the buffing glaze, allow the substrate to mimic the gradual shadings present in natural wood. However, the printing cylinders used to provide the woodgrain prints are expensive and have a limited useful life. Furthermore, these methods do not provide for the use of different patterns on the same board; each board is printed using a given set of print cylinders.

Lightweight vinyl films or heat transfer foils are commercially available, and may be used to impart a natural wood-like appearance to wood composites. Heat transfer foils are typically backed by a carrier film for ease of handling and application. These vinyl films and heat transfer foils typically are applied to the composite by heat and/or pressure using either a membrane press or a vacuum press. For example, "Formella, Membrane Pressing: No Longer a Mystery," *Furniture Design & Manufacturing* (March 1996), discloses a method of using a membrane press to apply a heat transfer foil to wood composites to provide a natural wood-like appearance. However, the method requires separate rolls of film for each design format or change in size of a given wood composite design in order for the heat transfer foil to remain in-register with the molded wood composite.

Heretofore it has been impractical to precisely register the film to a molded wood composite in either a membrane press or vacuum press in a one-step operation because the film is likely to wrinkle, shrink, and/or move, resulting in a part which is out of register. Furthermore, commercially-available vinyl film materials may not consistently draw into deep molded (e.g., greater than nine millimeters (mm)) profiles. Use of vinyl films does not allow the artisan to imprint color or grain changes in register onto the wood composite without dedicated rolls for each size and product pattern. Such color or grain changes may be accomplished through the use of pre-printed films designed especially for the application, however, these films are extremely costly, difficult to register, and may draw unevenly, stretching or breaking when drawn or molded in multiple directions.

In view of the foregoing, it would be desirable to provide a wood composite coating method that allows for color and/or grain changes in register, as well as enhancing the embossing of wood composite appearance in a single step, while maintaining both a consistently high yield of finished wood composite board and the appearance of natural wood.

SUMMARY OF THE INVENTION

The invention is directed to a method of selectively coating wood composites using die-cut foil parts. More specifically, the invention is directed to a method of selectively coating in-register a wood composite, the method comprising the steps of: (a) positioning one or more die-cut foil pieces (or layers) in-register on a surface of the wood composite, the die-cut foil pieces comprising a carrier film; (b) overlaying the die-cut foil pieces with an overlaying foil placed over the entire surface of the wood composite, the overlaying foil comprising a carrier film; (c) membrane pressing the wood composite, die-cut foil pieces, and overlaying foil; and, (d) removing the carrier film(s) from the areas covered by both the one or more die-cut foil peices and the overlaying foil, to provide a selectively coated in-register wood composite.

Such a method is useful for providing registered color or grain for wood composites, or for selectively applying decorative patterns, logos, or mosaic trims to a wood-grained product.

The invention also is directed to a semi-finished wood composite structure. More specifically, the invention is directed to a semi-finished wood composite structure comprising: (a) a flat, molded, semi-molded, or post-molded wood composite substrate; (b) die-cut foil pieces (or layers) uniformly coating at least one or more portions of a surface of the wood composite; and, (c) an overlaying foil uniformly coating the entire surface of the wood composite.

Advantages of the invention may become apparent to those skilled in the art from a review of the following detailed description, taken in conjunction with the drawings and the appended claims.

BRIEF DESCRIPTION OF THE DRAWINGS

For a complete understanding of the inventive method and product, reference should be made to the following detailed description and accompanying drawings wherein.

Figure 1:
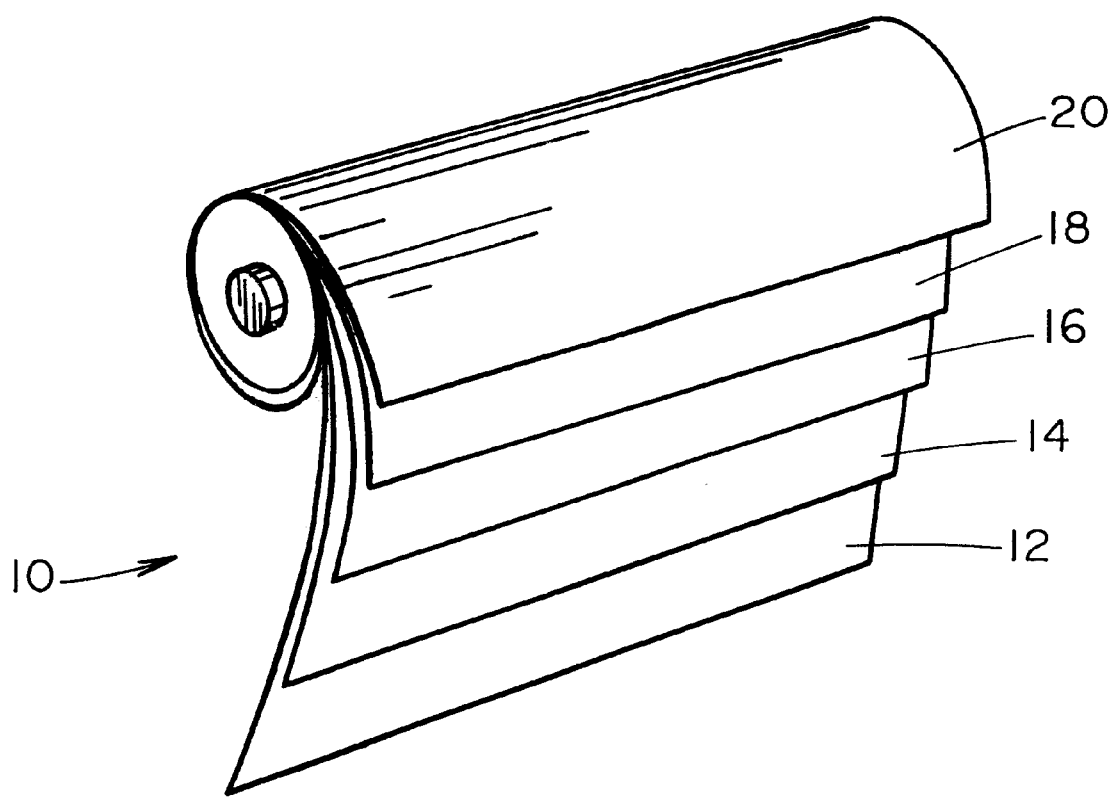
FIG. 1 is a scheaf view of a die-cut foil.

While the invention is susceptible of embodiment in various forms, there is illustrated in the drawing figures and will hereafter be described specific embodiments of the invention, with the understanding that the disclosure is intended to be illustrative, and is not intended to limit the invention to the specific embodiments described and illustrated herein.

DETAILED DESCRIPTION OF THE INVENTION

The invention is directed to a method of selectively coating wood composites in a single step, while maintaining registration of the wood composite with the coating. Such a method is useful in imparting color or grain changes to the wood composites, or for coating wood composites with embossed designs (e.g., logos, brand names, or decoration). The invention also is directed to a structure provided by preparing a wood composite.

Die-cut foil laminate pieces (or layers) are positioned by hand, for example, in-register on a wood composite product, matching the grain direction or orientation of the design. The foil pieces may be any suitable laminate material, such as, for example, poly(methyl methacrylate), cellulose acetate, cellulose acetate propionate, cellulose acetate butyrate, poly (ethylene terephthalate), poly(butylene terephthalate), polyvinyl chloride, polyvinylidene chloride, polyvinyl alcohol, polyvinyl acetate, and co-polymers thereof.

Preferably the die-cut foil laminate pieces are backed by a film carrier, preferably made of a polyester or a polyvinyl compound, such as, for example, poly(ethylene terephthalate), poly(butylene terephthalate), polyvinyl chloride, polyvinylidene chloride, polyvinyl alcohol, polyvinyl acetate, and copolymers thereof. More preferably, the film carrier is selected so as not to interact with an overlaying foil upon application of heat and/or pressure. In a preferred embodiment, the film carrier is a poly(ethylene terephthalate) carrier, e.g., a Mylar® (DuPont Chemical Co.) carrier, such as Flexrite™ foil (CFC International). A suitable adhesive is applied to a surface of the die-cut foil, using any suitable technique (e.g., a spray or a sponge brush), or to the substrate to adhere the die-cut foil pieces to the substrate. Preferably, the adhesive is a polyurethane adhesive, and more preferably, the adhesive is a membrane adhesive such as Jowat #150-01 (Jowat Corp.).

The overlaying foil then is laid over the entire composite, in the grain or design direction desired in the finished product. The overlaying foil may be any suitable laminate material, such as, for example, poly(methyl methacrylate,), cellulose acetate, cellulose acetate propionate, cellulose acetate butyrate, poly(ethylene terephthalate), poly(butylene terephthalate), polyvinyl chloride, polyvinylidene chloride, polyvinyl alcohol, polyvinyl acetate, and copolymers thereof. Furthermore, the overlaying foil may possess a different color, texture, design, or stamping from the die-cut foil piece. The overlaying foil preferably is backed by a film carrier, preferably made of a polyester or a polyvinyl compound, such as, for example, poly(ethylene terephthalate), poly(butylene terephthalate), polyvinyl chloride, polyvinylidene chloride, polyvinyl alcohol, polyvinyl acetate, and copolymers thereof The entire wood composite then is laminated with both the die-cut foil pieces and the overlaying foil in a single step, using any suitable membrane pressing lamination method, e.g., application of heat and pressure. In a preferred embodiment, the wood composite is laminated with the die-cut foil piece and overlaying foil through the application of heat and pressure in a membrane press. Any suitable device that applies heat and pressure across a membrane, such as, for example, a hot air membrane press or a hot liquid membrane press, may be used. Such membranes may be of varying thickness, in order to control variations in temperature and/or pressure differential across and between the surface of the wood composite, the die-cut foil pieces, and the overlaying foil. More preferably, the membrane has a thickness of about one to about five mm. If the membrane is thicker than about five mm, the fidelity of the wood composite may be substantially compromised.

After lamination, the carrier film of the overlaying foil is pulled away from the wood composite once the product has sufficiently cooled to about 120° F. (49° C.). In a preferred embodiment, the film carrier of the die-cut foil prevents the overlaying foil from adhering to the areas covered by the die-cut foil, resulting in a wood composite selectively coated with the laminate of the overlaying foil. The film carrier of the die-cut foil then is removed from the area selectively covered by the die-cut foil. One unexpected result of the inventive method is a product which is coated selectively with films of different colors and/or textured grains, while the laminate from the die-cut foil remains perfectly in register with the wood composite.

A rigid support caul or backer panel is typically placed above or below the wood composite during the pressing (or application) process, depending on the type of press used to apply hot transfer foil. Such a support caul or backer panel allows the hot transfer foil to draw or wrap completely around all sides (edges) of the wood composite, thus contributing to a more realistic appearance. In addition, the support provided by the support caul or backer panel limits the direct stress on (or breakage of) the molded wood composite daring application of the hot transfer foil. For example, in typical medium density fiberboard products cabinet door, the hot transfer foil would be able to completely wrap around the product.

The support caul or backer panel should be sufficiently solid to adequately support the molded composite during the pressing process; however, they should also have minimal sharp edges, as these can cause tearing of the membrane during the lamination pressing process, or cause permanent deflection in the pressed material due to improper positioning in the caul or support panel. Design or selection of suitable support cauls or backer panels can be determined by those skilled in the art based on the thickness of the wood composite being pressed.

Wood composites for use in accordance with the invention include man-made boards of bonded wood sheets and/or lignocellulosic materials, commonly referred to in the art by the following exemplary terms: fiberboards such as hardboard, medium density fiberboard, and softboard; chipboards such as particleboard, waferboard; and strandboard. Wood composites also include man-made boards comprising combinations of these materials. Particularly preferred wood composites include molded medium density fiberboards (i.e., a density in a range of about 30 pounds per cubic foot ($lbs/ft^3$) to about 45 $lbs/ft^3$) and molded high density boards or hardboards (i.e., a density of about 45 $lbs/ft^3$ or greater). According to the invention, the wood composite cam have various thicknesses, ranging from about ⅛-inch to about 1⅝-inches, and, in one embodiment, about ⅛-inch to about ½-inch. More specifically the wood composite can have thickness of about ⅛-inch, ¼-inch, ⅓-inch, ⅜-inch, ½-inch, ⅝-inch, ⅔-inch, ¾-inch, ⅞-inch, 1-inch, 1¼-inches, 1¼-inches, 1⅓-inches, 1⅜-inches, 1½-inches, and/or 1⅝-inches. These decorative wood composites can be used as floors, ceilings, walls, wall coverings, wainscots, partition systems, doors, and furniture components, such as chairs, tables, cabinets, and cabinet doors, for example.

Referring now to the embodiment shown in the drawing figures, wherein like reference numbers represent identical elements or features in the various figures, FIG. 1 illustrates a typical hot transfer foil 10 containing an adhesive layer 12, a first color coat/decorative grain 14, a protective finish 16, a first release coating 18, and a carrier film 20, illustratively formed with a Mylar® resin.

Figure 2:
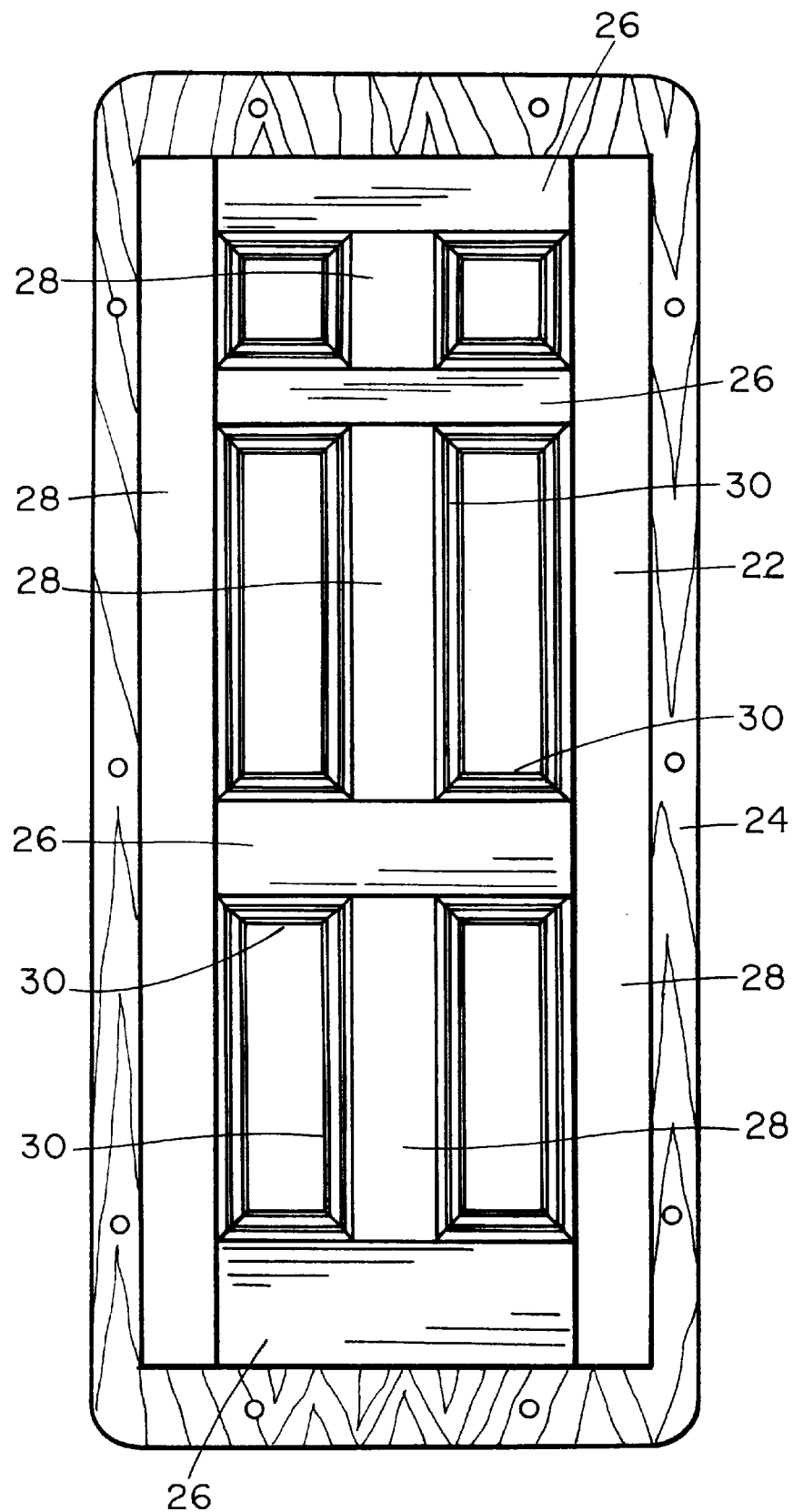
FIG. 2 is a front, elevational view of a molded door facing placed within a caul or support.

Illustrated in FIG. 2 is a wood composite, more specifically a molded door facing 22 that is sitting within a cavity (not shown) of a suitable support caul or backer panel 24. As shown in FIG. 2, the molded door facing 22 has both horizontal and vertical flat surfaces 26 and 28, respectively, and contoured, molded or profiled surfaces 30 which together impart a decorative appearance to the door.

Figure 3:
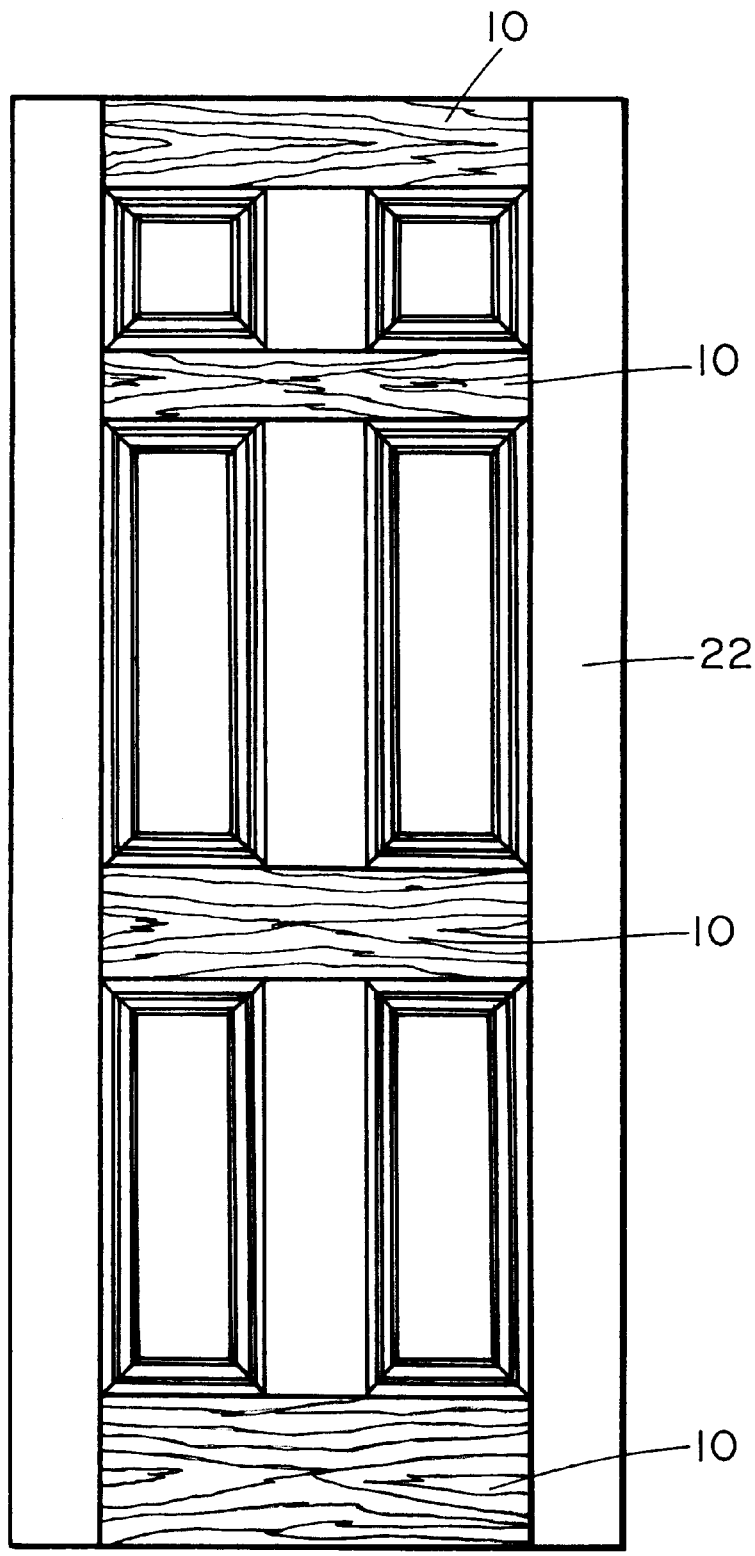
FIG. 3 is a front, elevational view of a molded door facing selectively covered with in-register, die-cut foil pieces.

In FIG. 3, the die-cut foil pieces 10 are shown overlying certain of the horizontal flat surfaces 26 of the molded door facing 22 (support caul or backer panel 24 is not shown in FIG. 3). The die-cut foil pieces 10 are positioned in-register on the selected horizontal surfaces 26 with the aid of a suitable adhesive, described above, and the pieces 10 contain a decorative pattern or wood-grain appearance desired of the finished product. The die-cut foil pieces 10 preferably are backed by a suitable film carrier, as described above.

Figure 4:
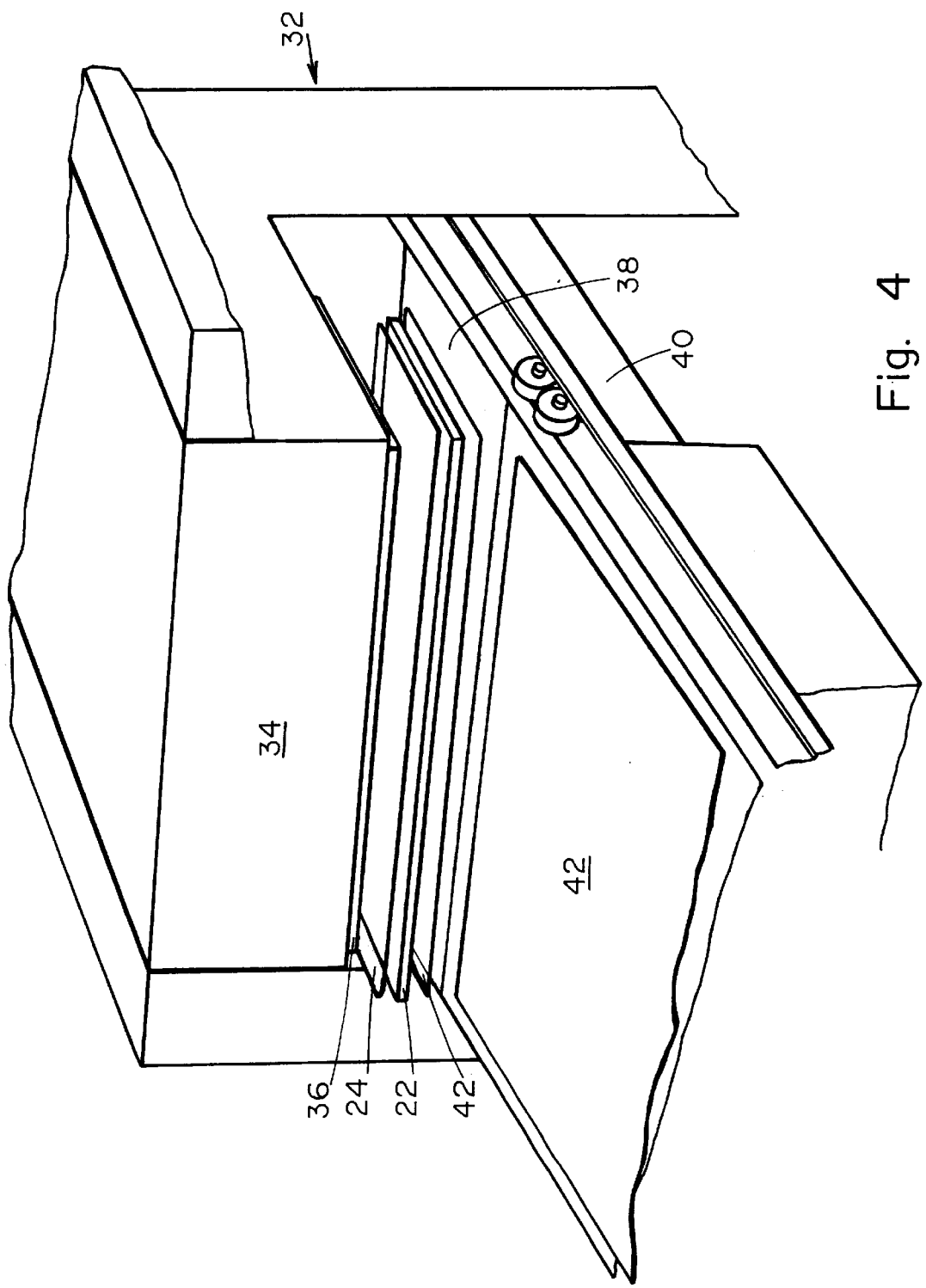
FIG. 4 is a side view of the door facing shown in FIGS. 2 and 3 along with the die-cut foil piece and hot transfer foil piece in a hot liquid membrane press.

FIG. 4 illustrates a hot liquid membrane pressing apparatus 32 suitable for laminating foil pieces to a wood composite. The apparatus 32 includes a pressing portion 36. The apparatus 32 also includes a membrane portion/bed 38, a tank 40 containing heated water and glycol, and, a vacuum mechanism (not shown). With the die-cut foil pieces 10 positioned as desired, the wood composite 22 is covered with a overlaying foil, as described above and shown in FIG. 4 as 42. This overlaying foil 42, also referred to as a hot transfer foil, includes an adhesive layer, as well as a second color coat/decorative grain, a second protective finish, a second release coat, and a second carrier, akin to those of the die-cut foil pieces 10, shown in FIG. 1.

With continued reference to FIG. 4, the wood composite 22 then is positioned in the pressing apparatus 32 face down (i.e., in a manner such that the foil-covered face of the composite 22 is in contact with the membrane portion/bed 38) and the back portion of the composite 22 is shown covered with the support caul or backer panel 24. The pressing portion 34 of the pressing apparatus 32 then is closed and with heat and pressure imparts a force and heat sufficient to laminate the foils 10 to the face of the composite 22. The membrane portion/bed 38 uses the heat and pressure to conform the die-cut foil 10 into the molded profiles of the wood composite 22.

Alternatively, a hot liquid pressing apparatus with the liquid bed above the pressing portion is suitable for laminating foil pieces to a wood composite.

Alternatively, hot air pressing apparatus also are suitable for laminating foil pieces to a wood composite. These apparatus generally include a membrane, a heated chamber disposed behind the membrane and containing means for receiving hot air, means for heating the air injected into the chamber, a pressing plate, and a conveying system to move the wood composite and support caul or backer panel into the pressing apparatus.

In a hot air pressing apparatus or in a hot liquid pressing apparatus (with the liquid above the wood composite), the wood composite is positioned in the pressing apparatus face up. Thereafter, the pressing plates of the apparatus are closed and, with heat and pressure, impart a force and heat sufficient to laminate the foils to the face of the composite. The membrane portion/bed uses the heat and pressure to conform the die-cut foil into the molded profiles of the wood composites.

Referring again to the drawing figures, within the pressing apparatus 32, the support caul or backer panel 24 limit the direct stress on the wood composite 22 caused by the pressing action of the pressing portion 34 and the membrane portion/bed 38. When the pressing action is complete, the membrane portion/bed 38 releases from the composite 22, and the product is removed from the pressing apparatus 32 and support caul or backer panel 24, and cooled.

Figure 5:
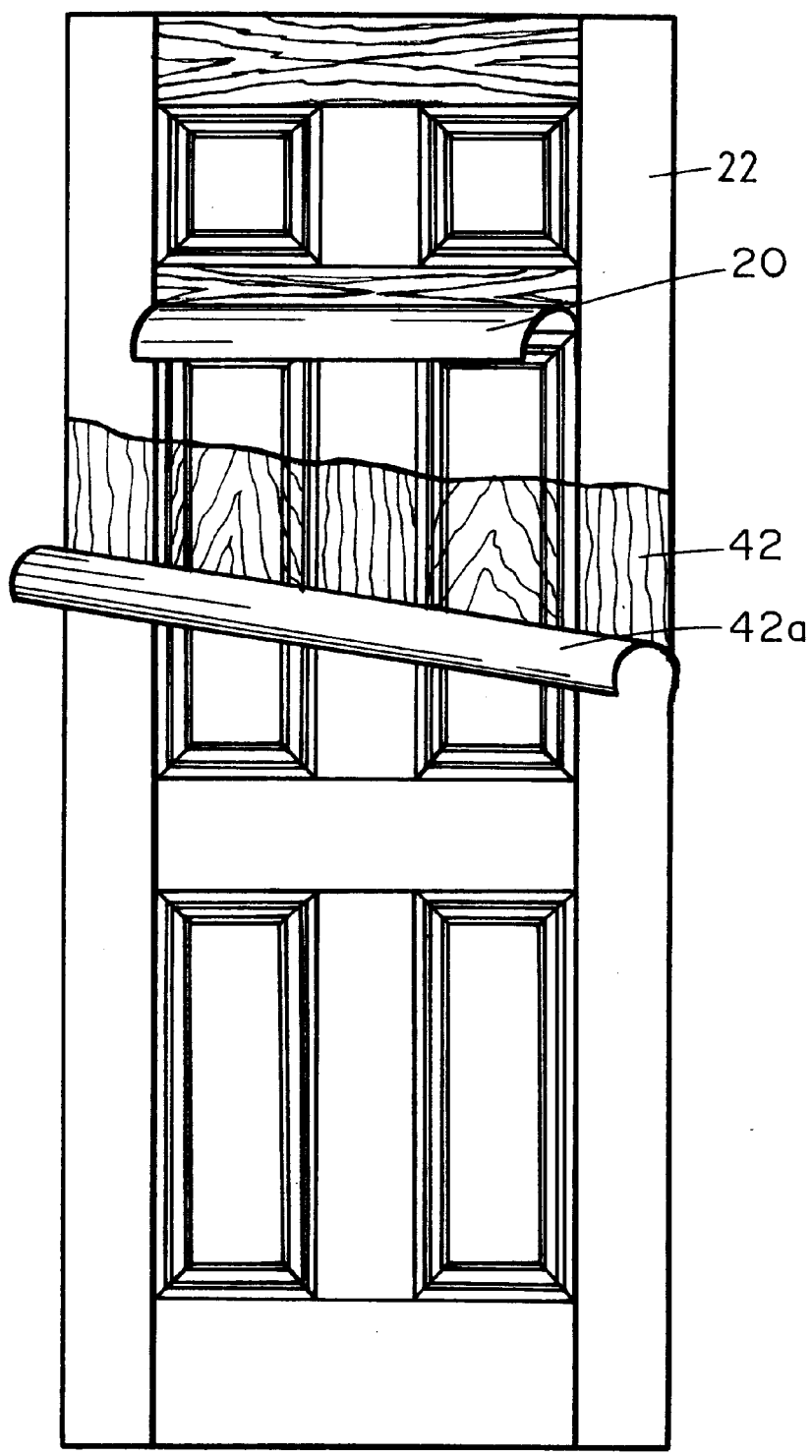
FIG. 5 is a front, elevational view of a molded door facing wherein a carrier film is being removed from the hot transfer foil and die-cut foil; and, FIG. 6 is a front, elevational view of a molded door facing finished according to the invention.
Figure 6:
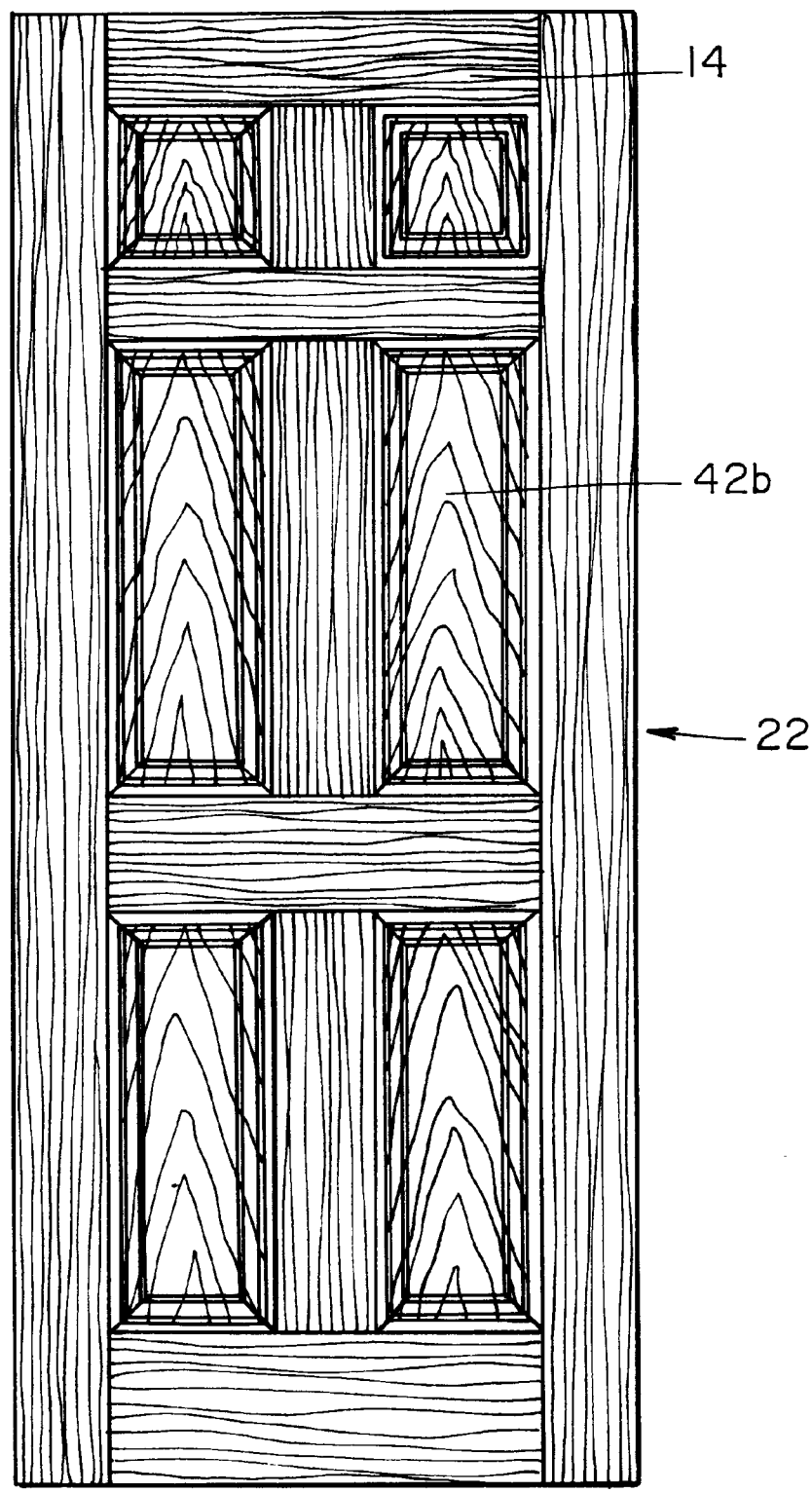

After cooling, the carrier film 42a of the overlaying foil 42 is removed from the wood composite 22 as illustrated in FIG. 5. Because the adhesive layer of the overlaying film does not adhere to the carrier film 20 of the die-cut foil 10, the second decorative grain is not applied to the wood composite 22 in the areas where the die-cut laminate foil 10 pieces were pre-positioned. Thereafter, the carrier film 20 of the die-cut foil 10 is removed, as illustrated in FIG. 5, leaving a wood composite 22 covered by a second decorative grain 42b and selectively covered by an in-register first decorative grain 14 shown in FIG. 6.

The molded wood composite need not be of uniform depth, height, or width, but may be molded, semi-molded, or post-molded into any of several structures, such as, for example, wainscots, moldings, cabinet doors or profiles in a generally uniform product such as a door facing. Alternatively, the wood composite also may be embossed prior to application of the foils with one or more designs, such as a brand name, logo, or a decorative inlay.

To maintain a smooth, unwrinkled finish in the final product, the heat transfer foil is drawn down smoothly into any sharp angles or deep profiles of the molded wood composite. Such a draw may be influenced by several factors including, but not limited to, the flexibility and properties of the heat transfer foil, the thickness and types of materials comprising the press membrane, heat, cycle time, and pressure of the press. If the molded profiles of the wood composite are too deep relative to the base level of the composite, the foil is subject to wrinkling, tearing, bridging, and/or mis-registration upon attachment to the wood composite.

Using vacuum press technology with a separate adhesive application, and a standard vinyl film, it is possible to laminate molded wood composites with profiles of greater depth, such as, for example, up to about 9 to about 11 mm. Similarly, if the membrane used in the pressing apparatus is greater than the critical thickness (e.g., greater than about five mm), the lack of flexibility in the membrane may cause the film to draw incompletely into the deep molded recesses of the wood composite. This may compromise the fidelity of the wood composite, and can lead to wrinkling or bubbling in corners of molded profiles. These potential problems can be avoided in membrane presses by optimizing the heat/pressure cycles and by controlling the amount of time the composite spends in the press exposed to the heat and pressure.

The invention provides a number of advantages. For example, through the use of a die-cut foil and type of film carrier, the inventive method enables the foil to be drawn in multiple directions simultaneously, limiting wrinkling and mis-registration of both the die-cut foil piece and the overlaying foil with respect to the wood composite. Furthermore, drawing the film in multiple directions allows the overlaying foil to adequately cover not only the top, but also all exposed sides of the molded wood composite resulting in a more realistic look.

By selectively applying membrane-pressed foils over veneer-faced products, or molded or embossed wood composites, the invention makes possible the appearance of an expensive wood using less expensive starting materials. Such appearances are useful in improving both the desirability and reception of the wood composite products in the marketplace.

Another advantage of the invention is the ability to coat thin pieces of wood composites without risk of damaging the composite during the pressing step. Specifically, by use of the rigid support caul or backer panel, wood composites having a thickness of about 0.5 inches or less can be placed in the press, laminated therein, and not suffer any damage (e.g., warpage or cracking). The support caul or backer panel protects the composite by absorbing much of the potentially damaging stresses that may be imparted by the press apparatus. The support caul and backer panel are particularly useful where the composite is thin (e.g., having a thickness of about 0.5 inches or less).

Another advantage of the invention is the increased versatility of design allowed by the inventive method. By layering multiple die-cut foil pieces beneath the overlaying foil which covers the entire product, complex designs which would have been either impossible, or obtainable only at prohibitive cost in time and money, can be achieved in a single pressing operation. For example, by layering different die-cut foil pieces in the windows of a doorframe, shading or color changes can occur from window to window within the doorframe, creating a more complex visual effect. Similarly, die-cut foil pieces can be used to create a metallic appearance in selected portions of the wood composite, or to stamp portions of the wood composite with a symbol or emblem, such as a company logo.

Yet another advantage of the invention is the high level of repeatability which can be obtained by the inventive method. By applying the die-cut foil pieces onto the actual product, the foil is held firmly in the proper position and orientation prior to processing, and automation of the application of the overlaying foil is achievable. Identically-sized wood composites can be processed automatically in perfect register on a consistent basis. Such repeatability limits the amount of downgrade material (or unusable product) generated by the pressing process. This material typically must be discarded, generating both waste and excess cost.

The gloss level of the finished wood composite may be influenced through the choice of materials comprising the die-cut foil pieces (or layers), the overlaying foil, the adhesive, and the surface finish of the membrane. If a high level of adhesive is used to hold the die-cut film piece in position during the lamination process, the gloss level of the area of the finished wood composite covered by the die-cut piece may differ from that of the overall wood composite. This can affect the desirability of the finished product among consumers.

The foregoing description is given for clearness of understanding only, and no unnecessary limitations should be understood therefrom, as modifications within the scope of the invention may be apparent to those skilled in the art.

What is claimed is:

1. A method of selectively coating in-register a wood composite, the method comprising the steps of:
    (a) positioning one or more die-cut foil pieces in-register on a surface of the wood composite, the die-cut foil pieces comprising a carrier film with a transferable design thereon;
    (b) overlaying the die-cut foil pieces with an overlaying foil placed over the entire surface of the wood composite, the overlaying foil comprising a carrier film with a transferable design thereon;
    (c) laminating the wood composite with the one or more die-cut foil pieces and the overlaying foil; and
    (d) removing the carrier film of the overlaying foil from the wood composite;
    (e) removing the carrier film of the one or more die-cut foil pieces, to provide a selectively-coated in-register wood composite.

2. The method of claim 1, wherein the wood composite is a molded wood composite, post-molded wood composite, or semi-molded wood composite.

3. The method of claim 1, wherein the wood composite is smooth.

4. The method of claim 3, wherein the wood composite exhibits at least one wood grain pattern.

5. The method of claim 3, wherein the wood composite is embossed with a design prior to step (a).

6. The method of claim 1, wherein the wood composite is textured.

7. The method of claim 6, wherein the wood composite exhibits at least one wood grain pattern.

8. The method of claim 6, wherein the wood composite is embossed with a design prior to step (a).

9. The method of claim 1, wherein the one or more die-cut foil pieces are a polyacrylate film, a cellulosic film, a polyvinyl film, or a polyester film.

10. The method of claim 9, wherein the one or more die-cut foil pieces are formed of a material selected from the group consisting of poly(methyl methacrylate), cellulose acetate, cellulose acetate propionate, cellulose acetate butyrate, poly(ethylene terephthalate), poly(butylene terephthalate), polyvinyl chloride, polyvinylidene chloride, polyvinyl alcohol, polyvinyl acetate, and co-polymers thereof.

11. The method of claim 1, wherein the carrier film of the die-cut foil pieces is a polyester or a polyvinyl compound.

12. The method of claim 11, wherein the polyester or polyvinyl compound is selected from the group consisting of poly(ethylene terephthalate), poly(butylene terephthalate), polyvinyl chloride, polyvinylidene chloride, polyvinyl alcohol, polyvinyl acetate, and copolymers thereof.

13. The method of claim 12, wherein the film carrier is formed of poly(ethylene terephthalate).

14. The method of claim 1, wherein the overlaying foil is a polyacrylate film, a cellulosic film, a polyvinyl film, or a polyester film.

15. The method of claim 14, wherein the one or more die-cut foil pieces is formed of a material selected from the group consisting of poly(methyl methacrylate), cellulose acetate, cellulose acetate propionate, cellulose acetate butyrate, poly(ethylene terephthalate), poly(butylene terephthalate), polyvinyl chloride, polyvinylidene chloride, polyvinyl alcohol, polyvinyl acetate, and co-polymers thereof.

16. The method of claim 1, wherein the film carrier of the overlaying foil is a polyester or a polyvinyl compound.

17. The method of claim 16, wherein the polyester or polyvinyl compound is selected from the group consisting of poly(ethylene terephthalate), poly(butylene terephthalate), polyvinyl chloride, polyvinylidene chloride, polyvinyl alcohol, polyvinyl acetate, and copolymers thereof.

18. The method of claim 17, wherein the film carrier is formed of poly(ethylene terephthalate).

19. The method of claim 1, wherein the one or more die-cut foil pieces and the overlaying foil possess differing wood grain designs.

20. The method of claim 1, wherein the one or more die-cut foil pieces and the overlaying foil possess differing colors.

21. The method of claim 1, wherein the one or more die-cut foil pieces and the overlaying foil possess identical wood grain designs.

22. The method of claim 1, wherein the die-cut foil pieces and the overlaying foil possess identical colors.

23. The method of claim 1, wherein at least one of the die-cut foil pieces and the overlaying foil possesses a pre-printed patterned design.

24. The method of claim 1, wherein the one or more die-cut foil pieces is held in-register using an adhesive.

25. The method of claim 24, wherein the adhesive is applied by a spray or a sponge brush.

26. The method of claim 24, wherein the adhesive is a polyurethane adhesive.

27. The method of claim 1, wherein the wood composite is laminated by heating at least one of the die-cut foil piece and the overlaying foil.

28. The method of claim 27, wherein at least one of the group consisting of the die-cut foil pieces and the overlaying foil are heated by using a membrane press.

29. The method of claim 28, wherein the membrane used has a thickness of about 1½ mm to about five mm.

30. The method of claim 26, wherein the wood composite is laminated by subjecting the one or more die-cut foil pieces and the overlaying foil to heat and pressure.

31. The method of claim 30, wherein the one or more die-cut foil pieces and overlaying foil are subjected to heat and pressure by using a hot-air or hot-liquid membrane press.

32. The method of claim 31, wherein the membrane used has a thickness of about 1½ mm to about five mm.

33. The method of claim 2, wherein the molded wood composite is a fiberboard.

34. The method of claim 33, wherein the fiberboard is selected from the group consisting of hardboard and medium density fiberboard.

35. The method of claim 2, wherein the molded wood composite has a thickness of about ⅛-inch to about 1⅝-inches.

36. The method of claim 35, wherein the molded wood composite has a thickness of about ⅛-inch to about ½-inch.

* * * * *